(12) United States Patent
Lülfing et al.

(10) Patent No.: US 10,093,293 B2
(45) Date of Patent: Oct. 9, 2018

(54) BRAKE PRESSURE MODULATOR OF AN ELECTRONIC BRAKING SYSTEM OF A UTILITY VEHICLE

(71) Applicant: WABCO GmbH, Hannover (DE)

(72) Inventors: Ralph-Carsten Lülfing, Garbsen (DE); Robert Otremba, Ronnenberg (DE); Stefan Rehling, Bückeburg (DE); Hartmut Schappler, Hannover (DE)

(73) Assignee: WABCO GmbH, Hannover (DE)

( * ) Notice: Subject to any disclaimer, the term of this patent is extended or adjusted under 35 U.S.C. 154(b) by 68 days.

(21) Appl. No.: 15/500,278

(22) PCT Filed: May 22, 2015

(86) PCT No.: PCT/EP2015/001051
§ 371 (c)(1),
(2) Date: Jan. 30, 2017

(87) PCT Pub. No.: WO2016/015795
PCT Pub. Date: Feb. 4, 2016

(65) Prior Publication Data
US 2017/0210365 A1    Jul. 27, 2017

(30) Foreign Application Priority Data

Jul. 31, 2014 (DE) .................. 10 2014 011 422

(51) Int. Cl.
*B60T 8/36* (2006.01)
*B60T 13/68* (2006.01)
(Continued)

(52) U.S. Cl.
CPC ............ *B60T 8/3675* (2013.01); *B60T 8/327* (2013.01); *B60T 8/94* (2013.01); *B60T 13/268* (2013.01);
(Continued)

(58) Field of Classification Search
CPC .......... B60T 8/3675; B60T 8/327; B60T 8/94; B60T 13/683; B60T 13/268; B60T 2270/413
See application file for complete search history.

(56) References Cited

U.S. PATENT DOCUMENTS 5,718,486 A    2/1998 Vollmer et al.
6,467,854 B2 * 10/2002 Frank ...................... B60T 8/323
                                                           137/596.17

(Continued)

FOREIGN PATENT DOCUMENTS

| DE | 10245916 A1 | 4/2004 |
| GB | 2 270 130 A | 3/1994 |
| WO | 03/033321 A1 | 4/2003 |

OTHER PUBLICATIONS

European Patent Office, Rijswijk, Netherlands, International Search Report of International Application No. PCT/EP2015/001051, dated Dec. 23, 2015, two pages.

*Primary Examiner* — Xuan Lan Nguyen
(74) *Attorney, Agent, or Firm* — Brinks Gilson & Lione

(57) ABSTRACT

A brake pressure modulator (1) of an electronic braking system of a utility vehicle includes pressure control circuits (13, 14) respectively associated with a braking circuit of a vehicle axle, each pressure control circuit (13, 14) comprises a compressed air supply system (4, 5), at least one redundancy control pressure path (21), at least one ventilation path (19, 19a) and a common electronic control unit (2). Said pressure control circuits (13, 14) can be controlled independently from each other by the electronic control unit (2). Each pressure control circuit (13, 14) has an independent ventilation path (19, 19a) and at least one of the pressure control circuits (13, 14) has an independent redundancy control pressure path (21) and at least one other of the pressure control circuits (13, 14) comprises a device (16a)

(Continued)

for forced venting in the event of a failure by means of the associated ventilation path (19a).

6 Claims, 2 Drawing Sheets

(51) Int. Cl.
    *B60T 8/32*       (2006.01)
    *B60T 13/26*     (2006.01)
    *B60T 8/94*       (2006.01)

(52) U.S. Cl.
    CPC ....... *B60T 13/683* (2013.01); *B60T 2270/413* (2013.01)

(56) References Cited

U.S. PATENT DOCUMENTS

| | | | |
|---|---|---|---|
| 8,560,162 B2 * | 10/2013 | Herges | B60T 8/1708 |
| | | | 701/29.7 |
| 8,979,217 B2 | 3/2015 | Steinberger et al. | |
| 2003/0025388 A1 | 2/2003 | Roether et al. | |
| 2010/0025141 A1 * | 2/2010 | Bensch | B60T 8/327 |
| | | | 180/271 |
| 2013/0214588 A1 | 8/2013 | Kiel et al. | |

* cited by examiner

BRAKE PRESSURE MODULATOR OF AN ELECTRONIC BRAKING SYSTEM OF A UTILITY VEHICLE

TECHNICAL FIELD

The invention relates to a brake pressure modulator of an electronic brake system of a utility vehicle.

BACKGROUND

Electronic brake systems allow precisely controllable and rapid braking of a vehicle. In this context, the output signal of a brake signal transmitter, which depends on a deceleration demand of the driver, is passed to a control unit. In the control unit, the output signal of the brake signal transmitter can be additionally modified by driving safety systems, such as an antilock system, a traction control system or a system for electronic stability control. From this, the control unit produces control signals, which are passed to "brake pressure modulators", which control the supply of a pressure medium, generally compressed air in the case of utility vehicles, to the individual braking devices or brake cylinders in a manner specific to the wheel or axle-wise by means of electromagnetically actuatable valve arrangements. In the event that said control unit fails, e.g. because the power supply thereof is interrupted, the electronic brake system generally has a redundant device associated with the service brake or the pressure control system in order to be able to bring the vehicle safely to a halt, even in this operating situation, by brake actuation.

The use of spatially and structurally separate brake pressure modulators for the individual pressure control circuits gives rise to a relatively large installation space requirement and manufacturing expense for air brake systems of the type described on light to medium-weight utility vehicles.

Given this background, DE 10 2009 009 811 A1 discloses a dual-circuit brake pressure modulator for an electronic brake system of a vehicle. The brake pressure modulator has two pressure control circuits, in which the flow paths of each circuit are fed by a dedicated pressure supply and are pneumatically separated up to the respective working pressure connection. One of the two working pressure connections is provided for connecting a brake cylinder of a left-hand wheel and a brake cylinder of a right-hand wheel of a front axle, and the other of the two working pressure connections is provided for connecting a brake cylinder of a left-hand wheel and a brake cylinder of a right-hand wheel of a rear axle. Respective pressure control valves for the operation of an antilock system are connected upstream of the brake cylinders. Each pressure control circuit is assigned a dedicated redundant control pressure circuit, by means of which a working pressure is passed to the working pressure connection of the respective pressure control circuit in the event of a failure of electric components of the brake system. Each redundant control pressure circuit is fed by a foot brake valve of a foot brake signal transmitter, which is connected pneumatically to the respective compressed air supply. A common electronic control device is provided for the two pressure control circuits of the dual-circuit brake pressure modulator, said control device producing a control signal corresponding to a setpoint working pressure for each pressure control circuit, depending on the braking demand signals from the foot brake signal transmitter. For each pressure control circuit there is a dedicated electromagnetically actuatable valve device, which produces an actual working pressure for the respective working pressure connection from the supply pressure of the associated compressed air supply in accordance with these control signals.

SUMMARY OF THE INVENTION

It is the underlying object of the invention to present a simple, compact and low-cost brake pressure modulator for an electronic brake system of a utility vehicle.

According to one aspect of the invention, it is possible, in the case of a brake pressure modulator of an electronic brake system, to integrate two independent pressure control circuits, together with a common electronic control module, into a common modular unit in order to reduce costs and the outlay on construction. A compact modular unit of this kind can be designed as a fully functional dual-circuit electropneumatic controller for a brake system. In order to reduce the costs for this modular unit even further, it is possible to minimize the design of the required failsafe components while taking into account the legal requirements.

Accordingly, a brake pressure modulator of an electropneumatic brake system of a utility vehicle, which has pneumatically actuatable wheel brakes at the brakable vehicle wheels, has at least two pressure control circuits combined to form a modular unit, in which the pressure control circuits are each associated with one brake circuit of a vehicle axle, in which each of the pressure control circuits is connected or can be connected to a dedicated compressed air reservoir, in which at least one redundant control pressure path, at least one venting path and a common electronic controller for the pressure control circuits are present, and in which the pressure control circuits can be controlled independently of one another by the electronic controller.

To achieve the stated object, the invention envisages that each pressure control circuit has a dedicated venting path, and that at least one of the pressure control circuits has a dedicated redundant control pressure path and at least one other of the pressure control circuits has a device for forced venting via the associated venting path in the event of a failure.

The term "brake pressure modulator" is taken to mean an electronically controllable valve arrangement, by means of which pressure control for a brake system of a vehicle can be carried out. The term "redundant control pressure path" is taken to mean a redundant pneumatic flow path in a brake pressure modulator, via which a brake function of a service brake of the vehicle is ensured in the event of a malfunction in a brake system.

The described design of the brake pressure modulator, provides a compact construction and can be produced at low cost with few components with a simple structure. In this at least dual-circuit brake pressure modulator, at least two pressure control circuits, which are fully pneumatically decoupled and can be controlled without affecting each other, are integrated into a modular block, wherein a redundant control pressure path is incorporated into one of the circuits. Accordingly, a redundant control connection is arranged in one of the two pressure control circuits, whereas a forced venting device but no redundant control connection is arranged in the other of the two pressure control circuits. This forced venting device can be implemented in a simple manner if a vent valve arranged in the associated venting path is switched so as to provide pneumatic venting in the deenergized state, i.e. is switched to allow throughflow. In contrast, a vent valve which is closed in the deenergized state is arranged in the pressure control circuit having a redundant control connection.

In the event of a malfunction of the electronic brake system, the wheel brakes at at least one axle can continue to be closed and released using the existing redundant control pressure path, while dispensing with electronic control. On the other hand, uncontrolled or unintentional braking at an axle on which the brakes do not have a redundant control connection is prevented in the event of a malfunction by means of forced venting of the pressure control circuit concerned. This provides a simple, low-cost and safe brake system which is well-suited, for example, to light utility vehicles, such as smaller goods vehicles or buses.

The compactly constructed dual-circuit brake pressure modulator can be arranged at various installation locations on the vehicle chassis. This makes it possible to adapt a circuit configured for the individual pneumatic connections to the wheel brakes to different vehicle types with little effort, such that the respective pipe lengths and pipe paths can be configured in an optimum manner.

In the case of a dual-circuit brake pressure modulator having the features of the invention, it is possible to envisage that the pressure control circuit which has a redundant control pressure path is associated with a front axle brake circuit, and that another pressure control circuit, which has the device for forced venting, is associated with the rear axle brake circuit.

Accordingly, the brake pressure modulator proposed acts as an axle brake modulator of an electronically controllable dual-circuit brake system. By means of two pneumatically separate pressure control circuits or valve circuits, it is possible to control the brake pressures independently of one another on each axle. The brake pressure modulator of dual-circuit construction is connected to a supply pressure for a front axle brake circuit and to a supply pressure, independent thereof, for a rear axle brake circuit. In the event of a malfunction of the electronic brake system, the vehicle can continue to be braked by means of the front axle wheels, the brake circuit of which is assigned a redundant control connection. In principle, it is possible to interchange the application of the two brake pressure circuits.

One embodiment of the brake pressure modulator according to the invention can be achieved by arranging two pressure control circuits in said modulator, wherein a first pressure control circuit has three 2/2-way solenoid valves, which control the flow paths and which are designed as a first air admission valve, a first vent valve and a redundant control valve, in which the first pressure control circuit has a pneumatically actuatable first relay valve that regulates the compressed air quantity, wherein the first air admission valve is closed when deenergized and is connected on the inlet side to a first compressed air reservoir and on the outlet side to the first relay valve, wherein the first vent valve is closed when deenergized and is connected on the inlet side to the first air admission valve and on the outlet side to a first venting path, wherein the redundant control valve is connected on the inlet side to a brake signal transmitter valve of a brake signal transmitter and on the outlet side to the first relay valve, wherein the first relay valve is connected to the first compressed air reservoir, to a first working pressure connection on the outlet side and to the first venting path, in which the second pressure control circuit has two 2/2-way solenoid valves, which control the flow paths and which are designed as a second air admission valve and a second vent valve, and in which a pneumatically actuatable second relay valve, which regulates the compressed air quantity, is arranged in the second pressure control circuit, wherein the second air admission valve is closed when deenergized and is connected on the inlet side to a second compressed air reservoir and on the outlet side to the second relay valve, wherein the second vent valve is open when deenergized and is connected on the inlet side to the second air admission valve and on the outlet side to a second venting path, and in which the second relay valve is connected to the second compressed air reservoir, to a second working pressure connection on the outlet side and to the second venting path.

Accordingly, an intention of the driver to decelerate the vehicle, which is indicated by an actuation of a brake pedal, is detected by a brake signal transmitter or foot brake valve. An electrical signal relating thereto is fed to the brake pressure modulator, which produces a respective brake pressure axle-wise at the working pressure connections in accordance with said signal in order to brake the vehicle in a corresponding manner by pneumatic pressurization of the brake cylinders of the wheel brakes. When the displacement of the brake pedal is reversed, the brake pressure is reduced axle-wise by the brake pressure modulator via the respective venting path. The brake signal transmitter furthermore has a valve, which is connected pneumatically to a compressed air supply. The brake signal transmitter valve makes available a redundant control pressure to the redundant control pressure path at all times. In the event of an electrical failure of the electronic controller, the brake circuit to which the redundant control pressure path is assigned can continue to be supplied with compressed air via this pressure path and thereby operated.

In addition to the two working pressure connections at the two pressure control circuits, the brake pressure modulator can have further working pressure connections. It is also possible to expand the brake pressure modulator to form a brake pressure modulator having more than two mutually independent pressure control circuits.

Moreover, it is possible, for individual control of the brake pressures at the wheel brakes, to envisage arranging wheel brake modulators which are designed as control valve devices and which interact with the axle-specific pressure control circuits of the brake pressure modulator, wherein, when a drive-relevant or deceleration-relevant driving safety system, such as an antilock system, a traction control system or an electronic stability control system, is activated, a brake pressure at the relevant wheel brakes can be varied individually as required. The electronic activation of the wheel brake modulators can be performed by the electronic controller of the brake pressure modulator.

It can furthermore be envisaged that the brake pressure supply to the wheel brakes can, if necessary, be shut off by the wheel brake modulators in the event of a malfunction. In the event of an electric and/or pneumatic failure in the axle brake modulator, the wheel brake modulators can accordingly shut off the wheel brake pressures. Unwanted unilateral braking of the vehicle is thereby prevented while taking into account the functioning of the wheel brake modulators. Moreover, possible running hot of one or more wheel brakes owing to residual pressures in the pressure control circuits in the event of a malfunction can be reliably avoided.

Thus, an electronic brake system designed in accordance with the invention can consist of a dual-circuit brake pressure modulator acting axle-wise and of a plurality of wheel brake modulators acting in a wheel-specific manner. Accordingly, the axle-wise control of the brake pressure modulator according to the invention can be combined with the wheel-specific control of the wheel brake modulators for the driving safety systems mentioned. The electronic controller for the pressure control circuits can have all necessary interfaces for acquiring and processing the relevant data and for controlling both the brake pressure modulator and the wheel brake modulators. It is likewise possible for further data which are already available in many vehicles on a vehicle data bus, such as wheel speeds, brake pad thickness, steering angle information and engine operating information, to be read in by the electronic controller and taken into account in electronic brake control. The electronic controller can be arranged as a module directly on the modular block of the brake pressure modulator.

The brake pressure modulator described is designed as a low-cost modular unit for at least two pressure control circuits having dual-circuit compressed air supply and single-circuit redundant pressure control. The two pressure control circuits are pneumatically fully decoupled in accordance with a dual-circuit brake system. One of the pressure control circuits has a redundant control pressure path and hence a redundant function. The other pressure control circuit has forced venting, which is effective if the electronic control system fails.

At this point, it should be mentioned that the brake pressure modulator can also be designed as a modular unit having a dual-circuit compressed air supply device and a dual-circuit redundant control pressure. For vehicles in which a redundant pressure connection is required both for the front axle and for the rear axle, it is possible, in place of a device for forced ventilation in the event of a failure, for the second pressure control circuit also to be designed to have a dedicated redundant pressure control path, being of identical construction to the first pressure control circuit. Corresponding conversion of the brake pressure modulator is possible and is easy to implement. In this case, the brake signal transmitter has two brake signal transmitter valves, which are pneumatically connected to the respective compressed air reservoir, thus allowing continued actuation of both brake circuits via the associated redundant control pressure paths in the event of an electrical failure of the electronic controller or an electrical failure of the brake modulator.

DETAILED DESCRIPTION OF THE DRAWINGS

The drawings are provided herewith for purely illustrative purposes and are not intended to limit the scope of the present invention.

Figure 1:
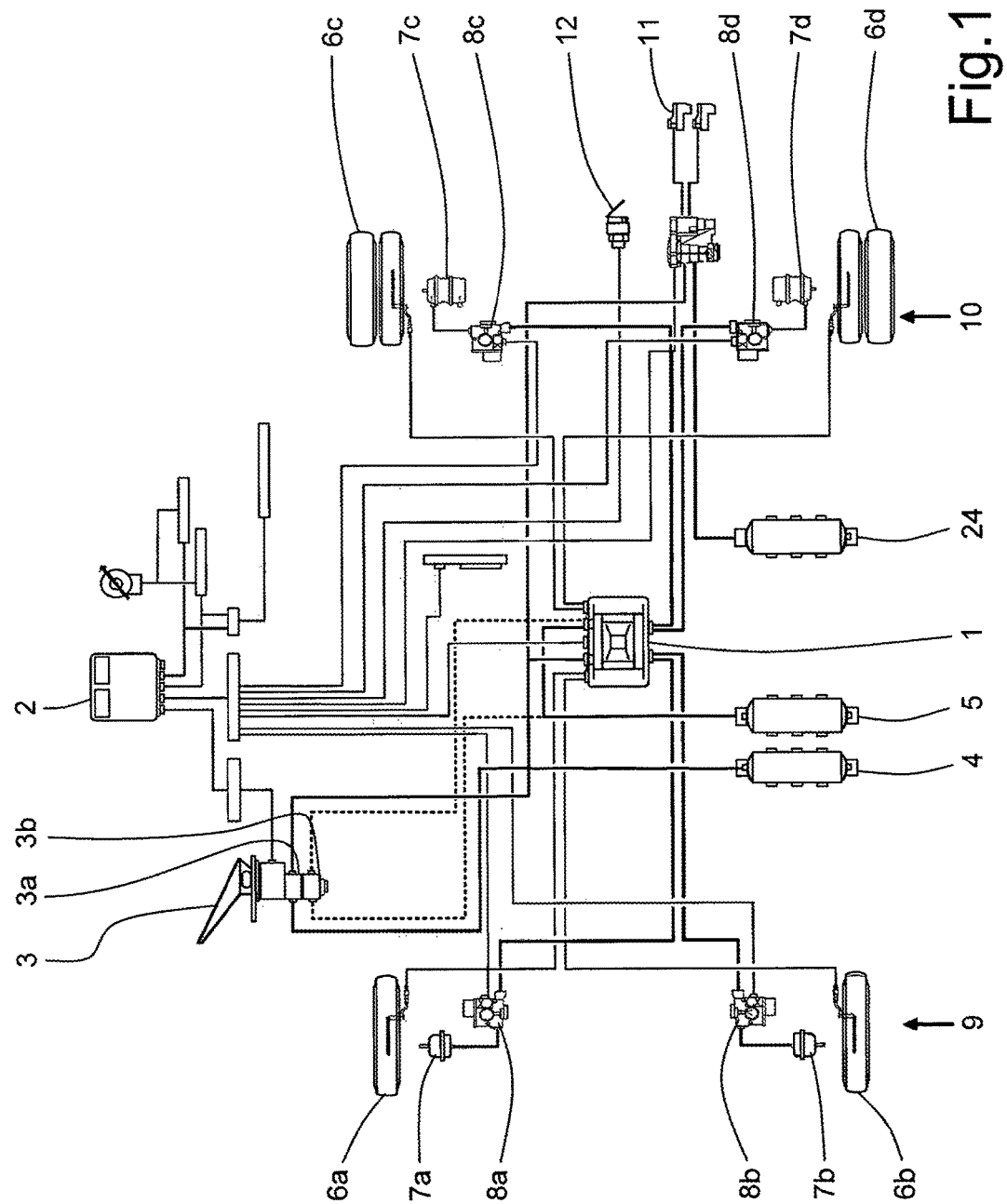
FIG. 1 shows a circuit diagram of an electronically controlled brake system of a utility vehicle having a brake pressure modulator according to a preferred embodiment of the invention.

In FIG. 1, the pneumatic links are illustrated in bolder lines than the electric leads in order to distinguish the pneumatic and electrical interconnection of the components.

The brake system shown in FIG. 1 has a brake pressure modulator 1, which is designed as a modular unit, in which hydraulic control components for controlling two brake circuits 9, 10 are assembled. The brake system furthermore includes an electronic controller 2, a foot brake signal transmitter 3 having a first brake signal transmitter valve 3a and an optional second brake signal transmitter valve 3b, a first compressed air reservoir 4 and a second compressed air reservoir 5, and respective wheel brakes 7a, 7b and wheel brake modulators 8a, 8b for the vehicle wheels 6a, 6b of a front axle brake circuit 9, and respective wheel brakes 7c, 7d and wheel brake modulators 8c, 8d for the vehicle wheels 6a, 6b of a rear axle brake circuit 10. The wheel brake modulators 8a, 8b, 8c, 8d are designed as solenoid valve devices, which adapt the brake cylinder pressures of the wheel brakes 7a, 7b, 7c, 7d in a wheel-specific manner when an antilock system, traction control system or an electronic stability control system comes into effect. Moreover, a trailer braking device 11, which can be supplied by a third compressed air reservoir 24 via an associated line, and an electrical connection 12 for a trailer vehicle are shown. A parking brake device that is present here per se is likewise not shown.

The brake pressure modulator 1 is arranged at a central installation location in the vehicle. The brake pressure modulator 1 is connected pneumatically via associated pipes to the wheel brakes 7a, 7b and the wheel brake modulators 8a, 8b of the front axle brake circuit 9 and to the wheel brakes 7c, 7d and the wheel brake modulators 8c, 8d of the rear axle brake circuit 10. Moreover, the brake pressure modulator 1 is connected to the two compressed air reservoirs 4, 5 via pipes. The two compressed air reservoirs 4, 5 are furthermore connected via branches in said pipes to the first brake signal transmitter valve 3a and, where present, to the second brake signal transmitter valve 3b, with the result that the brake signal transmitter valves 3a, 3b are likewise connected pneumatically to the brake pressure modulator 1.

The brake pressure modulator 1 is connected via electric leads to the electronic controller 2 controlling it and to sensors (not designated specifically) to the vehicle wheels 6a, 6b, 6c, 6d, e.g. for measuring the wear of the brake pad and/or for determining wheel speed. Moreover, the foot brake signal transmitter 3 and the wheel brake modulators 8a, 8b, 8c, 8d are connected to the electronic controller 2 via electric leads.

Figure 2:
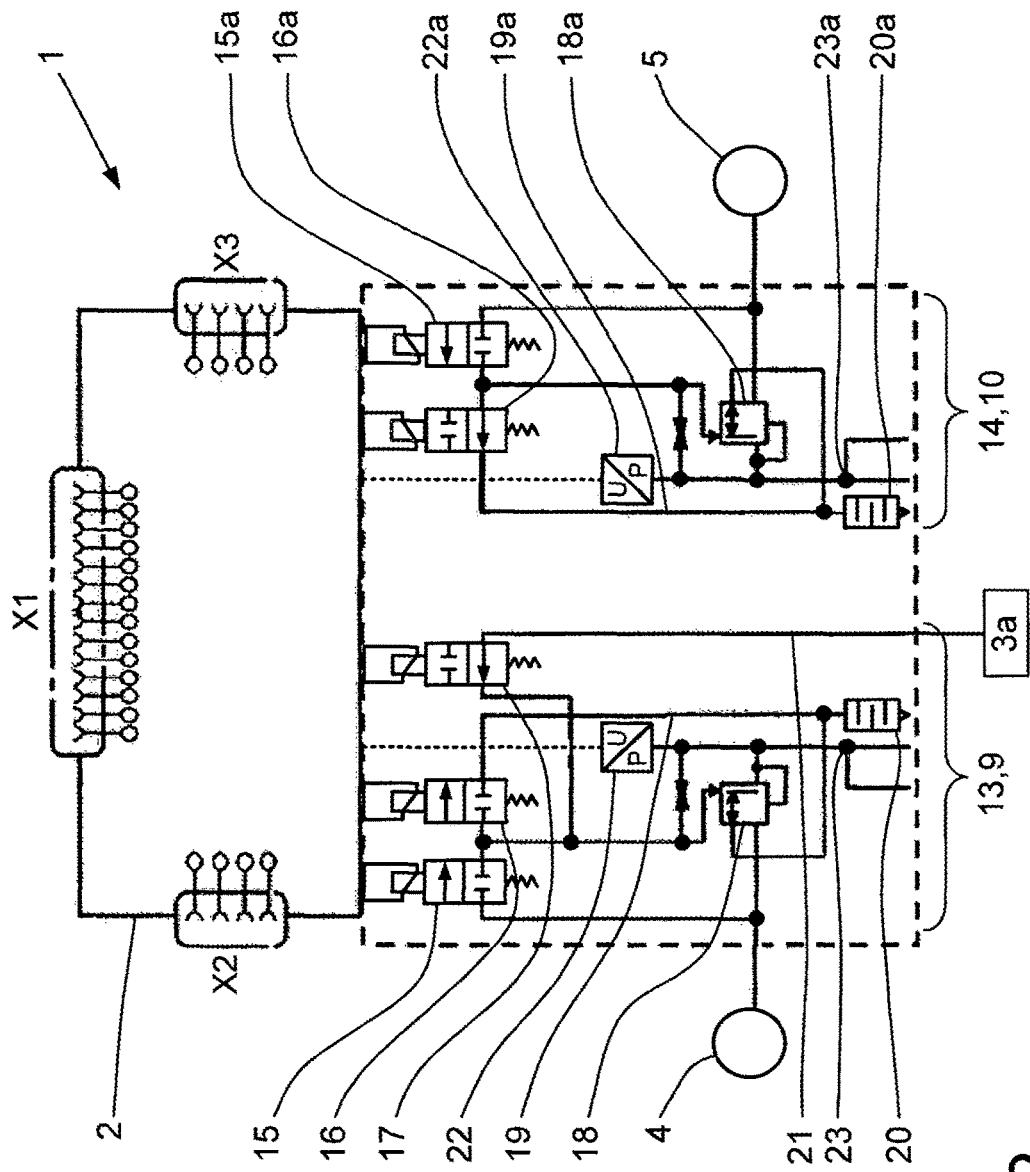
FIG. 2 shows a brake pressure modulator in accordance with 1, embodied as a dual-circuit axle brake modulator, for a first pressure control circuit of a front axle and a second pressure control circuit of a rear axle.

FIG. 2 shows the brake pressure modulator 1 in detail. The brake pressure modulator 1 is combined with the electronic controller 2 to form a modular unit, e.g. in a common housing or by means of a common mounting plate. The electronic controller 2 has three plug-in locations X1, X2, X3 for the connection of the electrical or electronic components mentioned. In FIG. 2, however, it is essentially the pneumatic interconnection of the components which is illustrated.

The brake pressure modulator 1 is used to control two pressure control circuits 13, 14, wherein a first pressure control circuit 13 is assigned to the front axle brake circuit 9 and a second pressure control circuit 14 is assigned to the rear axle brake circuit 10.

The first pressure control circuit 13 has three electrically actuatable 2/2-way solenoid valves 15, 16, 17, which are configured as a first air admission valve 15, a first vent valve 16 and a redundant control valve 17, as well as a pneumatically actuatable first relay valve 18. The coils of the three solenoid valves 15, 16, 17 are electrically connected to the electronic controller 2 and form a pilot control unit of the first pressure control circuit 13. The first relay valve 18 controls, i.e. increases or reduces, the compressed air quantity in the first pressure control circuit 13. It is assigned a first pressure sensor 22, which is connected via an electric lead (indicated by dashes) to the electronic controller 2.

The first air admission valve 15 is configured to be closed by spring force when deenergized. On the inlet side, it is connected to the first compressed air storage tank 4 and, on the outlet side, it is connected to the first relay valve 18. The first vent valve 16 is likewise configured to be closed by spring force when deenergized. On the inlet side, it is connected to the first air admission valve 15 and, on the outlet side, it is connected to a first venting path 19. A first muffler 20 is arranged in the first venting path 19 for noise attenuation.

On the inlet side, the redundant control valve 17 is connected via a redundant control pressure path 21 to the first brake signal transmitter valve 3a and, on the outlet side, it is connected to the first relay valve 18. The first relay valve 18 is connected to the first compressed air storage tank 4, to a first working pressure connection 23 on the outlet side, and to the first venting path 19. The wheel brakes 7a, 7b or the brake cylinders thereof as well as the wheel brake modulators 8a, 8b of the front axle brake circuit 9, which are associated with and connected upstream of the brake cylinders of the wheel brakes 7a, 7b, are connected to the working pressure connection 23 (see also FIG. 1).

In contrast to the first pressure control circuit 13, the second pressure control circuit 14 does not have a redundant control pressure path or a redundant control valve. Accordingly, the second pressure control circuit 14 has two electrically actuatable 2/2-way solenoid valves, which are configured as a second air admission valve 15a and as a second vent valve 16a, as well as a pneumatically actuatable second relay valve 18a. The second air admission valve 15a and the second vent valve 16a are connected electrically to the electronic controller 2 and form a pilot control unit of the second pressure control circuit 14. The relay valve 18a controls the compressed air quantity in the second pressure control circuit 14. It is assigned a pressure sensor 22a, which is connected via an electric lead to the electronic controller 2.

If unactuated, the second air admission valve 15a is closed by spring force when deenergized. On the inlet side, it is connected to the second compressed air storage tank 5 and, on the outlet side it is connected to the second relay valve 18a. In contrast to the first pressure control circuit 13, the second vent valve 16a of the second pressure control circuit 14 is held open by spring force when deenergized if unactuated. On the inlet side, the second vent valve 16a is connected to the second air admission valve 15a and, on the outlet side it is connected to a second venting path 19a. As a result, the second vent valve 16a acts as a forced venting device in the event of an electrical failure of the electronic controller 2. A second muffler 20a is arranged in the second venting path 19a for noise attenuation.

The second relay valve 18a is connected to the second compressed air storage tank 5, to a second working pressure connection 23a on the outlet side and to the second venting path 19a. The wheel brakes 7c, 7d or the brake cylinders thereof as well as the wheel brake modulators 8c, 8d of the rear axle brake circuit 9, which are associated with and connected upstream of the brake cylinders, are connected to the second working pressure connection 23a (see also FIG. 1). Also connected to the second working pressure connection 23a is a second pressure sensor 22a, which is connected via an electric lead (indicated by dashes) to the electronic controller 2.

At this point, it may be mentioned that the brake signal transmitter valve 3b indicated in FIG. 1 is provided for the case where the second pressure control circuit 14 likewise has a redundant control pressure path. In this case, both pressure control circuits 13, 14 are of identical construction.

In the normal, i.e. fault-free, electronically controlled braking mode, the respectively required pressure for subjecting the front axle brakes 7a, 7b and the rear axle brakes 7c, 7d pneumatically to a force is produced separately for each of the two brake control circuits 13, 14 in the respective relay valve 18, 18a by activating the solenoid valves 15, 16; 15a, 16a mentioned in accordance with a brake demand signal from the foot brake signal transmitter 3, and said force is made available at the working pressure connections 23, 23a.

Via the first brake signal transmitter valve 3a, the redundant control pressure path 21 is likewise subjected to pressure. If the electronic controller 2 fails, this pressure for the first pressure control circuit 13, i.e. the front axle brake circuit 9, is passed through via the open redundant control valve 17, with the result that at least a prescribed braking action at the front wheels 6a, 6b is ensured. In the event of an electrical fault, the second pressure control circuit 14 is subjected to forced venting by means of the second vent valve 16a, thus ensuring that it is not possible for an uncontrolled or unintended braking action to occur at the rear axle brake circuit 10.

While the above description constitutes the preferred embodiments of the present invention, it will be appreciated that the invention is susceptible to modification, variation and change without departing from the proper scope and fair meaning of the accompanying claims.

What is claimed is:

1. A brake pressure modulator (1) of an electropneumatic brake system of a utility vehicle, which has pneumatically actuatable wheel brakes (7a, 7b, 7c, 7d) at brakable vehicle wheels (6a, 6b, 6c, 6d), the brake pressure modulator (1) comprising:
    at least two pressure control circuits (13, 14) combined to form a modular unit, in which the pressure control circuits (13, 14) are each associated with a brake circuit (9, 10) of a vehicle axle, in which each of the pressure control circuits (13, 14) is configured to be connected to a dedicated compressed air reservoir (4, 5),
    the modular unit further including a common electronic controller (2) for the pressure control circuits (13, 14),
    wherein the at least two pressure control circuits (13, 14) are configured to be controlled independently of one another by the electronic controller (2),
    wherein each of the at least two pressure control circuits (13, 14) has a dedicated venting path (19, 19a),
    wherein at least one of the at least two pressure control circuits (13, 14) has a dedicated redundant control pressure path (21), and
    wherein at least one other of the at least two pressure control circuits (13, 14) has a device (16a) for forced venting via the dedicated venting path (19a) upon occurrence of a failure.

2. The brake pressure modulator of claim 1, wherein the at least one of the at least two pressure control circuits (13) that has the redundant control pressure path (21) is associated with a front axle brake circuit (9), and wherein the at least one other of the at least two pressure control circuits (14) that has the device (16a) for forced venting is associated with a rear axle brake circuit (10).

3. The brake pressure modulator of claim 1, wherein the at least two pressure control circuits (13, 14) are arranged such that:
    a first pressure control circuit (13) has three 2/2-way solenoid valves, which control a plurality of flow paths and are configured as a first air admission valve (15), a first vent valve (16) and a redundant control valve (17),
    wherein the first pressure control circuit (13) has a pneumatically actuatable first relay valve (18) that regulates a first compressed air quantity, wherein the first air admission valve (15) is closed when deenergized and has an inlet side connected on an inlet side to a first compressed air reservoir (4) and has an outlet side connected to the first relay valve (18), wherein the first vent valve (16) is closed when deenergized and has an inlet side connected to the first air admission valve (15) and an outlet side connected to a first venting path (19), wherein the redundant control valve (17) has an inlet side connected to a brake signal transmitter valve (3a) of a brake signal transmitter (3) and an outlet side connected to the first relay valve (18), and wherein the first relay valve (18) is connected to the first compressed air reservoir (4), to a first working pressure connection (23) on an outlet side, and to the first venting path (19), a second pressure control circuit (14) has two 2/2-way solenoid valves (15a, 16a), which control the flow paths and which are configured as a second air admission valve (15a) and a second vent valve (16a), wherein a pneumatically actuatable second relay valve (18a), which regulates a second compressed air quantity, is arranged in the second pressure control circuit (14), wherein the second air admission valve (15a) is closed when deenergized and has an inlet side connected to a second compressed air reservoir (5) and an outlet side connected to the second relay valve (18a), wherein the second vent valve (16a) is open when deenergized and is connected on an inlet side to the second air admission valve (15a), and on an outlet side to a second venting path (19a), and wherein the second relay valve (18a) is connected to the second compressed air reservoir (5), to a second working pressure connection (23a) on an outlet side, and to the second venting path (19a).

4. The brake pressure modulator of claim 1, wherein the wheel brakes (7a, 7b, 7c, 7d) are each assigned a wheel brake modulator (8a, 8b, 8c, 8d) configured as control valve devices, which interact with axle-specific pressure control circuits (13, 14), wherein, when a drive-relevant or deceleration-relevant driving safety system is activated, the brake pressure modulator is configured to vary an individual brake pressure at each of the wheel brakes (7a, 7b, 7c, 7d) as required.

5. The brake pressure modulator of claim 4, wherein the wheel brake modulators (8a, 8b, 8c, 8d) are configured to shut off a brake pressure supply to the wheel brakes (7a, 7b, 7c, 7d) upon occurrence of a malfunction.

6. The brake pressure modulator of claim 4, wherein the drive-relevant or deceleration-relevant driving safety system includes at least one of an antilock system, a traction control system or an electronic stability control system.

* * * * *